UNITED STATES PATENT OFFICE.

BRUNO KNIFFLER, OF WINCHESTER, MASSACHUSETTS, ASSIGNOR TO VERA CHEMICAL COMPANY, OF STONEHAM, MASSACHUSETTS, A CORPORATION.

PROCESS OF MAKING WATERPROOF COMPOSITION FOR COATING PAPER.

1,266,956.  Specification of Letters Patent.  Patented May 21, 1918.

No Drawing.  Application filed November 22, 1913. Serial No. 802,520.

*To all whom it may concern:*

Be it known that I, BRUNO KNIFFLER, a citizen of the United States, residing at Winchester, in the county of Middlesex and State of Massachusetts, have invented an Improvement in Processes of Making Waterproof Composition for Coating Paper, of which the following is a specification.

This invention relates to a process of making waterproof composition for paper involving as essential ingredients stearic-acid, ammonia, paraffin-wax or their equivalents, and a diluent, which may be applied to paper in liquid form, and the ammonia or its equivalent and the diluent eliminated, thereby leaving the stearic-acid and paraffin-wax or their equivalents deposited upon the paper and rendering the paper substantially impervious to water. Such a composition forms the subject-matter of my application #802,519, filed November 22, 1913. The molecules of the stearic-acid and paraffin-wax are separated in the liquid form of the composition and are thoroughly mixed, so that when left as a deposit upon the paper they are intimately associated together. Stearin or oleic acid or some other fatty acid may be employed in lieu of stearic-acid, but as stearic-acid is well suited for the purpose and is easily obtainable and convenient to work, I prefer its employment. Good results are obtained when equal amounts of stearic-acid and paraffin-wax are employed, but these relative proportions may be varied.

In carrying out my invention the stearic-acid is saponified by a volatile alkali such as ammonium hydrate, thereby to form an ammonium soap, and as the temperature of formation and decomposition of ammonium soaps are very close I prefer to employ a closed vessel capable of withstanding a pressure of say 150-pounds per square inch when heated to a temperature between 125° C. and 200° C. In such a vessel having a capacity of say 200 gallons I place 50-pounds of commercial stearic-acid, 50-pounds of paraffin-wax and 20-pounds of concentrated ammonium hydrate. The vessel is then closed and steam added at say 90-pounds pressure to produce a temperature of about 150° C. Some water is furnished by the condensation of the steam, sufficient to form the ammonium soap. This temperature is allowed to continue for say one half hour when the stearic-acid becomes saponified by the ammonium hydrate forming an ammonium soap and the paraffin which itself does not saponify becomes emulsified therewith, the whole forming a permanent emulsion. The emulsion is then allowed to cool to about 30° C.; then water is added to bring the emulsion to about a 10% solid, and the whole thoroughly stirred. The composition is then ready for use. It may be drawn off, filtered and shipped in barrels or other containers. As this is an aqueous emulsion the bulk of the water may be added at any time, even after shipment, if desired. In lieu of ammonium hydrate other volatile alkalies of this character may be employed, such as ammonium-carbonate, the object being to form an ammonium soap with which the paraffin becomes emulsified, and which may be decomposed by the application of heat. In this condition the molecules of the stearic-acid and paraffin are separated and are thoroughly intermingled and when applied to the paper and subsequently heated so that the water is evaporated and the ammonium soap decomposed and the ammonia driven off, a thin uniform layer of mixed stearic-acid and paraffin is left as a deposit on the paper which renders the paper impervious to water.

I claim:—

1. The process herein described of making a waterproof composition for paper consisting in saponifying a fatty acid by a volatile alkali, and emulsifying an unsaponifiable wax with the soap thus produced, forming an aqueous emulsion, and subsequently diluting the emulsion with water.

2. The process herein described of making a waterproof composition for paper consisting in saponifying stearic-acid by ammonium hydrate at a moderately high temperature in a closed vessel in the presence of water, and emulsifying paraffin with the ammonium soap thus produced and diluting the emulsion with water.

3. The method of emulsifying a waxy mixture which consists in adding ammonia to a fatty acid to form an ammonium soap in the presence of paraffin-wax, heating the mixture, and utilizing a sufficient quantity of water to form with the mixture a viscous mass.

4. The method of emulsifying a waxy mixture which consists in adding ammonia to stearic acid to form ammonium stearate in the presence of paraffin wax, heating the mixture, and utilizing a sufficient quantity of water to form with the mixture a viscous mass.

In testimony whereof, I have signed my name to this specification, in the presence of two subscribing witnesses.

BRUNO KNIFFLER.

Witnesses:
B. J. NOYES,
H. B. DAVIS.